May 12, 1931.  H. PARKER  1,804,478
MULTIPLE CONDUIT AND SPACING SUPPORTS THEREFOR
Filed March 9, 1928  3 Sheets-Sheet 1
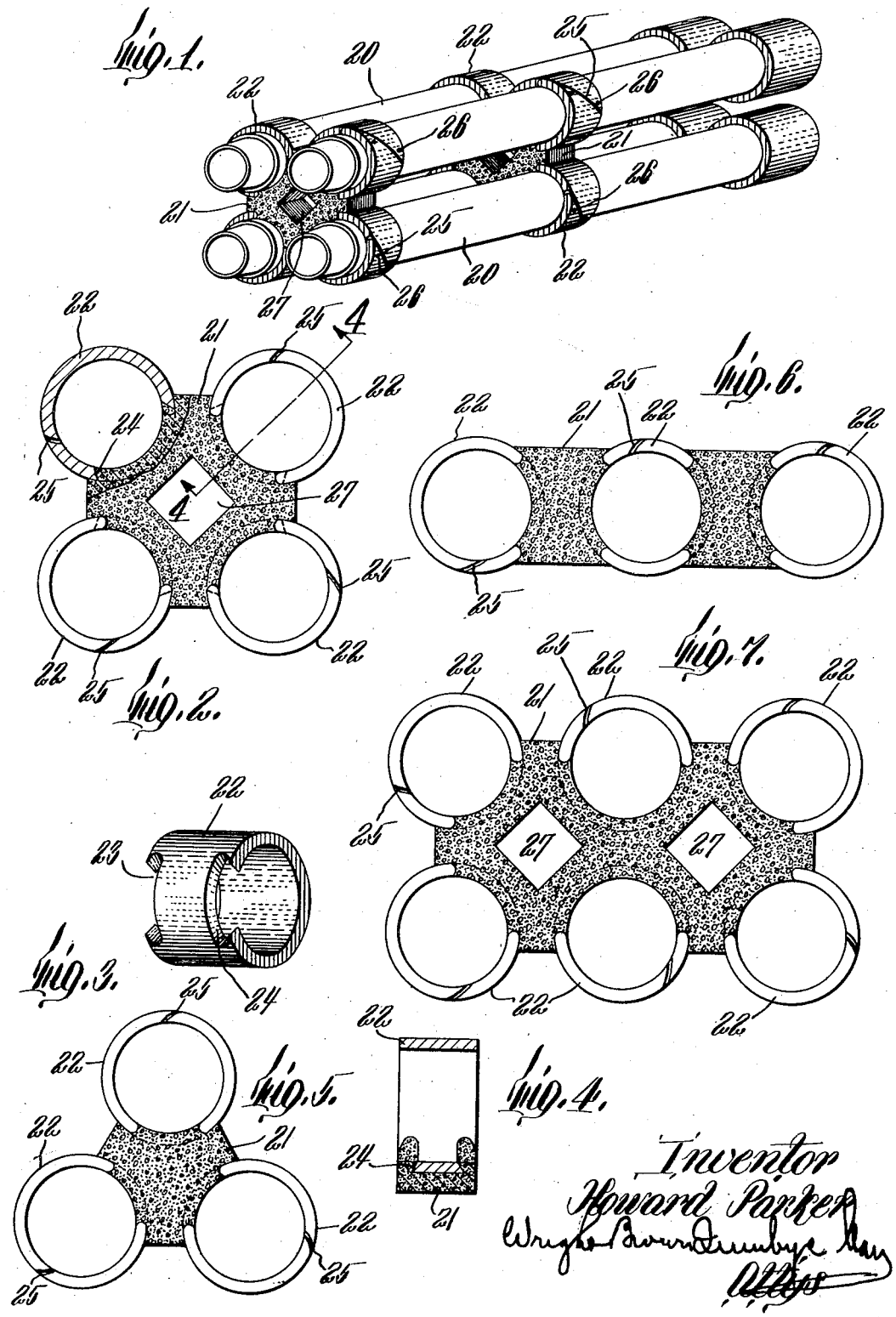

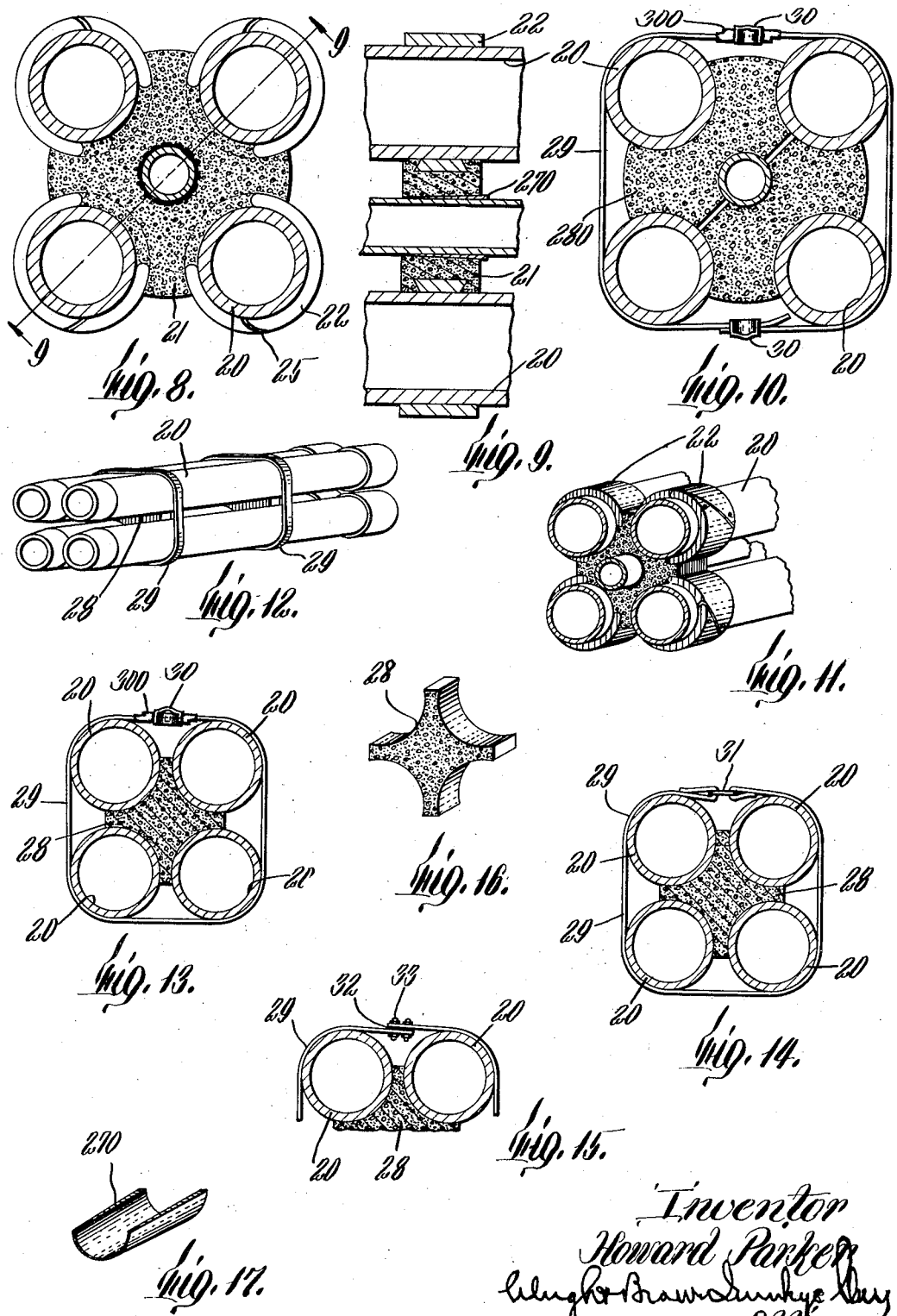

May 12, 1931. H. PARKER 1,804,478
MULTIPLE CONDUIT AND SPACING SUPPORTS THEREFOR
Filed March 9, 1928 3 Sheets-Sheet 3
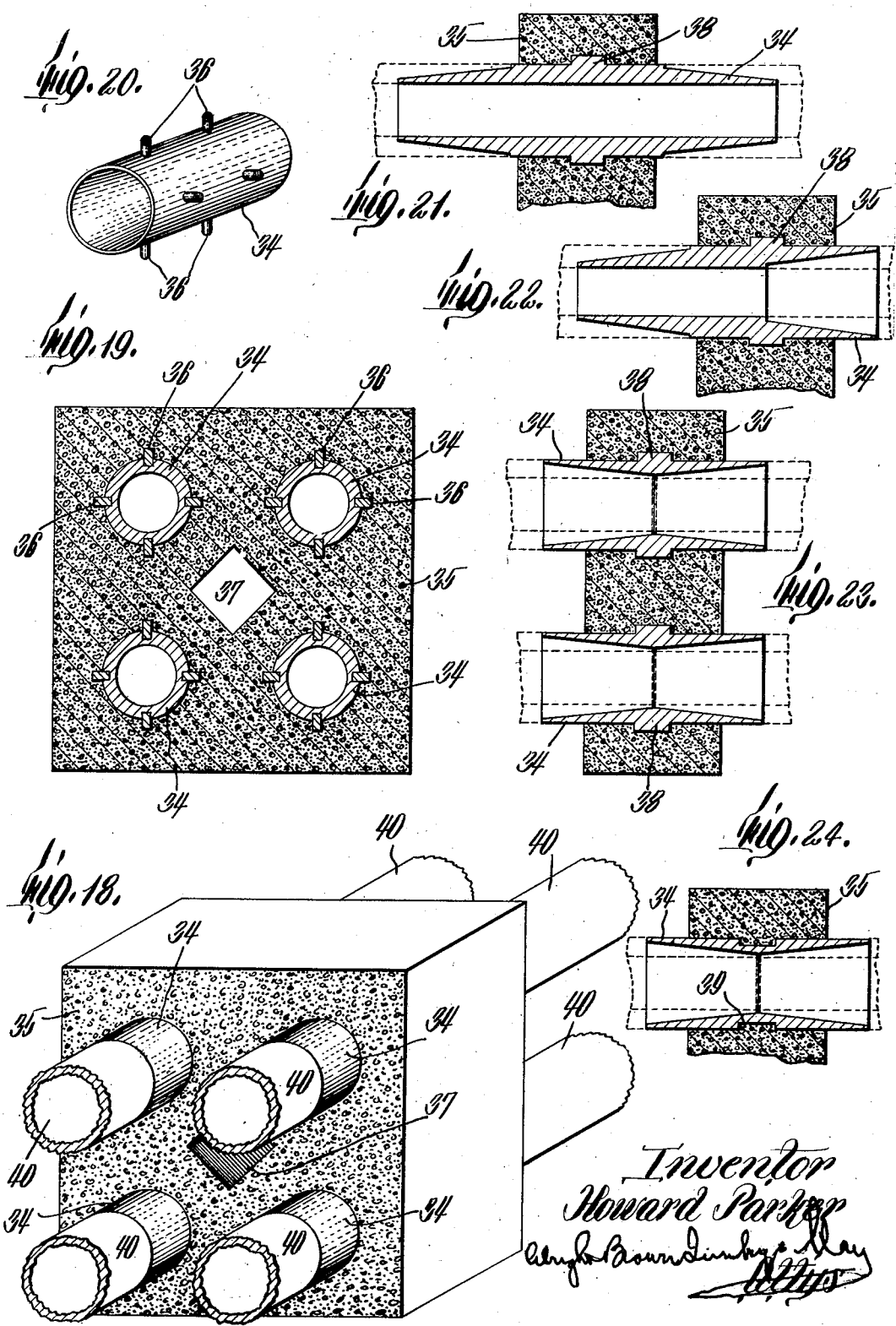

Patented May 12, 1931

1,804,478

UNITED STATES PATENT OFFICE

HOWARD PARKER, OF BERLIN, NEW HAMPSHIRE, ASSIGNOR TO BROWN COMPANY, OF BERLIN, NEW HAMPSHIRE, A CORPORATION OF MAINE

MULTIPLE CONDUIT AND SPACING SUPPORTS THEREFOR

Application filed March 9, 1928. Serial No. 260,452.

This invention relates to multiple conduit sections which may be built up in units by securing two or more sections of single conduit in spaced side-by-side relation, the multiple sections being adapted to be laid end to end, the corresponding conduit ends being joined together to form a continuous multiple conduit of any desired length. For many purposes, a fabricated conduit of waterproofed fiber is found desirable by reason of its comparative toughness, strength, durability, lightness and low price. A particularly desirable kind of conduit of the waterproofed fiber type is made by winding a sheet of wet pulp upon itself under pressure in convolutions until the desired wall thickness is obtained, drying out the moisture, and saturating the dry tube with asphaltic or other waterproofing material. Sections of such conduit may be assembled and secured together to form sections of multiple conduit by the use of suitable spacers and means for holding the structure together. The sections of single or multiple conduit may be laid end to end and united by suitable couplings to form continuous conduits of indeterminate length suitable for use as pipe-lines or for telephone or electric power cables or for any other uses to which conduits are put. In some cases, it is preferred to use the conduits as cores about which concrete or other filling may be poured and set, the fiber conduits remaining in the structure to line the bores which they form in the filler. In building up sections of multiple conduit for use as cores in concrete construction or the like, there are several factors to be considered, depending to some extent on the eventual use for which the conduit is intended. As one of the chief uses of this type of conduit is at present to hold telephone cables or electric power transmission cables, it is essential that no metal fasteners be driven into the material of the conduit. It is desirable that the spacers between the individual sections making up the multiple section be of a durable material, preferably adapted to bond with the concrete or other material to be used in filling in the spaces between the individual conduits after they are placed in position. It is also desirable that the spacers be constructed so that the axes of the individual conduit sections will be spaced from one another with the greatest possible uniformity so as to minimize the possibility of difficulty in fitting together the several abutting ends of conduits in successive sections.

With these desiderata in view, multiple conduit sections are provided according to the present invention, which comprise spacing elements of cement or an equivalent which bond with concrete filling which may be used to surround the conduits when laid, and which thus result in a final uninterrupted casing of concrete or cement about each individual conduit. This is particularly desirable when the conduit is to be used for electric power cables since in case of overload and fusing of the cable in one conduit, the trouble is confined to that one conduit by the concrete, and cannot extend to adjacent conduits.

According to the invention, the cement or concrete spacers may be provided with non-metallic means for holding the individual sections in proper positions relative to the spacers and to each other. Such means may conveniently comprise collars to engage the conduit sections. These collars may take the form of coupling elements fixed in the spacer block and adapted to interfit with the ends of individual conduit sections, or the collars may be made of short pieces of oversize conduit large enough to receive the individual conduit sections and to engage on their peripheral surfaces. Collars of the latter type are preferably each split transversely so as to permit a slight expansion to receive the conduit sections in a tight fit, the material of the collars being relatively stiff but having sufficient resilience for this purpose. These splits may preferably be made by cutting the collars diagonally. If desired, non-metallic fasteners, such as wooden pegs, may be driven through the collars and into the walls of the conduit sections to anchor the latter securely in place. Instead of, or in addition to the collars, flexible tie members may be secured around a multiple conduit section to hold the individual sections in place against the spacers.

Multiple members comprising a plurality of coupling elements fixed in a spacing block of cement or the like, can conveniently be used with sections of individual conduit in the laying of a multiple conduit of indefinite length. To this end, the multiple coupling members are set up successively, individual conduit sections being assembled therewith progressively as indicated in Figure 13, tight joints being formed between the conduit sections and the corresponding coupling elements. The multiple coupling members thus act both as couplings and as spacers for the individual assembled conduits which may thereupon be encased in concrete. This form of the invention is particularly advantageous from the point of view of economy in transportation from the mill to the job. Assembled sections of multiple conduit are comparatively bulky compared to the combined bulk of the individual conduits of which they are made. Hence a considerable economy of space may be effected by this form of the invention.

A similar economy in space for transportation may be effected by providing a multiple conduit section which can be shipped in knock-down form and may be easily and accurately assembled on the field prior to its installation.

Other advantageous features of the invention will be apparent to one skilled in the art from the following description and from the drawings, of which,—

Figure 1 shows in perspective, a section of multiple conduit embodying the invention.

Figure 2 is an end elevation of a spacer unit, a portion being broken away.

Figure 3 is a perspective view of one of the collars used in connection with a spacer.

Figure 4 is a section on the line 4—4 of Figure 2.

Figure 5 is an end elevation of a spacer designed for three individual conduits.

Figure 6 is a spacer for three individual conduits arranged in a different way.

Figure 7 is a spacer for six individual conduits.

Figure 8 is an elevation of a spacer for five conduits.

Figure 9 is a section on the line 9—9 of Figure 8.

Figure 10 is an elevation of a modified form of spacer for five conduits.

Figure 11 is a fragmentary perspective view of a multiple conduit section made with spacers such as shown in Figure 8.

Figure 12 is a perspective view of a modified form of multiple conduit embodying the invention.

Figure 13 is a cross sectional view of the multiple conduit shown in Figure 12, showing a spacer in elevation.

Figures 14 and 15 show slightly modified forms of tie members for the conduit illustrated in Figure 13.

Figure 16 is a perspective view of a spacing element used in the multiple conduit shown in Figure 12.

Figure 17 is a perspective view of a wedge which may be employed with a spacer as shown in Figure 8.

Figure 18 shows in perspective a spacer unit in the form of a multiple coupling block, portions of individual conduit sections being also shown to indicate the manner of use of the coupling block when laid.

Figure 19 is a transverse section of the multiple coupling block shown in Figure 18.

Figure 20 shows a coupling having anchoring pins projecting therefrom.

Figures 21–24 are sections illustrating couplings of various kinds which may be cast in a block.

Referring to the drawings in detail, Figure 1 illustrates a preferred embodiment of the invention including four sections 20 of individual conduit, preferably made of interfelted pulp fibers impregnated with suitable waterproofing material. Such conduit may conveniently be made by wrapping a sheet of wet pulp upon itself under pressure until the desired wall thickness is obtained, then drying the tube thus formed and saturating the dried tube with asphaltic or other suitable waterproofing material. In order to hold the sections of individual conduit in suitable side-by-side spaced relation, spacing units may be provided comprising blocks 21 of concrete or other suitable material in which are cast collars 22 which are preferably of the same material as the conduits 20. The collars 22 may conveniently be made from scrap pieces of oversize conduit, the inner diameter of which is equal to or slightly less than the exterior diameter of the conduits. In order to provide for as accurate spacing as possible between the axes of the conduits 20, the collars 22 may be held in a jig so that their centers are correctly spaced, then the cement spacers 21 may be poured so as to interlock with the collars thus held. This insures maximum accuracy possible with the materials used. In order to lock the collars 22 with the spacer block 21, the former are preferably notched in some such manner as that illustrated in Figure 3, wherein are shown notches or recesses 23 cut into each end face of the collar 22, the wall of the collar adjacent the recess being bevelled inwardly as at 24. As illustrated in Figure 4, this construction results in a dove-tail interlock between each collar 22 and the block 21, whereby the collars 22 are firmly held in place. In order to insure a tight fit of the conduits 20 within the collars 22, the latter are preferably slit by a diagonal cut 25 so that the ends thus are able to yield slightly and to clamp a conduit inserted through the collar with a resilient grip. When a multiple conduit section has been assembled as shown in Figure 1, the elements may be permanently secured in position if desired by driving one or more wooden pegs 26 through the collars 22 near the pointed portions made by the slits 25. These pegs anchor the collars more securely to the individual conduits and strengthen the structure materially. In some cases, it may be preferred not to slit the collars, as in Figure 3. If the size and shape of the spacer block 21 permits, an aperture 27 may be left in the central portion thereof to reduce the weight of the multiple conduit and to afford the filling material which may be poured around the conduits after they are laid in position, more points of bonding between the portions of the filling material on opposite sides of each spacer block. If desired, the opening 27 may be suitably shaped to receive an additional conduit as shown in Figure 8. A multiple conduit of this type would be of use, for example, where it is desired to use a number of conduits for electric power lines, and also to run some signal-carrying wires. The latter would go into the smaller central conduit, thus making possible a compact and economical installation. In order to secure the central conduit in place in a section of multiple conduit, any suitable means, such as cement, an adhesive, or wedging elements, may be employed. Wedging elements 270 are illustrated by way of example. While four individual conduits are a convenient number for assembling into a multiple conduit as shown in Figure 1, the invention is not limited to any particular number, but may include two, three, or more. Examples of other numbers of conduit are illustrated in Figures 5, 6 and 7.

Figures 10 and 12–16 illustrate a modified form of the invention, which, while shown and described herein, is not claimed herein, but forms the subject matter of my copending application Serial No. 375,427, filed July 2, 1929, Figure 12 showing a multiple conduit composed of single sections 20 of individual conduit grouped about a plurality of spacer elements 28. These elements are preferably of concrete or similar durable non-conducting material. With this type of spacer, there is no means attached thereto for holding the conduit sections 20 in position. Tie members 29 may therefore be provided to extend around the group of conduit sections as shown in Figure 12 at spaced intervals and to hold them together in their proper places. The tie members 29 may be of any suitable material. Steel ribbon is convenient for this purpose since it is readily drawn tight and crimped and clipped as at 30 (Figures 10 and 13) or otherwise fastened together by suitable means known to the art. If it is desired to avoid a complete metal circuit around the multiple conduit which in some cases is considered objectionable as when the conduits are used to hold electric cables, the metallic loop about the conduit formed by the tie members 29 may be interrupted by insulating the end portions of the band with rubber, tape, or the like, as at 300 (Figures 10 and 13) before they are pinched together with a clip. This may be done by coating each end portion of metal strips of suitable length with unvulcanized rubber, then vulcanizing the rubber on the strip, or sheaths of rubber or other suitable insulating material may be slipped over the ends of each strip, or the ends may be taped. The metal loop of the tie member may also be interrupted by the use of a block 31 of fiber or other non-conducting material to hold the ends of the tie member 29 as shown in Figure 14. Another method of breaking the metallic circuit is illustrated in Figure 15, an insulating pad 32 being used between the end portions of the band 29, the ends being joined by fasteners 33 which may be insulated from the band 29 by suitable bushings. In order to avoid difficulties which may be experienced in drawing a band 29 taut in connection with making an insulated joint between its end portions, a couple of pieces of band may be joined with insulation between the ends as shown in Figures 10, 13, 14 or 15; then the single jointed band thus formed may be passed around the multiple conduit section and its free ends may be drawn taut and clipped as shown in Figure 10. This obviates the possibility of the stretching or clipping tools marring the insulation at the insulated joint when the band is applied to a multiple conduit section. This type of multiple conduit has the advantage of being readily assembled with little difficulty by the use of simple portable tools. It thus lends itself to economy in transportation charges since the multiple conduit may be shipped in comparatively compact knock-down form, the constituent members being assembled on the field prior to the installation of multiple conduit on the job. If desired, the conduit such as is illustrated in Figure 12 may be laid on the job and encased in concrete up to the upper surface thereof. After the concrete has partially set, the tie members 29 may be cut and pulled out of the concrete, leaving no metallic members embedded therein.

In assembling multiple conduit either of the kind illustrated in Figure 1 or that illustrated in Figure 12, the spacing and holding members are preferably arranged at suitable intervals to give sufficient strength to the structure as a whole. One of the spacing elements is preferably located closely adjacent to one end of the multiple section, the spacing element most remote therefrom being spaced from the further end of the section by a sufficient distance to permit a slight lateral bending of the individual conduit ends in order to facilitate the interengagement of these ends with the corresponding ends of the next adjacent section of multiple conduit as laid. The spacer element 28 may be made if desired with a central aperture to receive an additional conduit as shown in Figure 10. The central conduit may be held in position as shown in Figures 8 and 9, or the spacer may be made in two portions 280 between which the central conduit is clamped when the parts of the multiple conduit section are drawn together by the tie members 29.

Figures 18-24 illustrate a spacer block 35 with a plurality of fixed collars which take the form of coupling elements 34 and are arranged in suitably spaced relation. The block is preferably of a suitable moldable material such for example as cement. In order to anchor the individual couplings 34 securely in place in the block 35, wooden pegs 36 or other anchoring members may be partly driven into the wall of each coupling 34. The desired number of couplings may then be held in a jig while the material for the block 35 is poured around them. If space permits, an opening or openings 37 may be left in the block to save weight and to afford more points of bonding for the concrete or other material subsequently poured around and between the conduits when installed on a job. Or, if preferred, the opening 37 may be shaped to receive a coupling for a central conduit in the manner shown in Figure 8. Instead of pegs 36 as anchoring means, I may provide other equivalent means such as peripheral rib 38 or other projections on the outer surface of each coupling. Similarly, one or more depressions such as a groove 39 may be formed on the outer surface of the couplings to lock with the block 35, such a groove being indicated in Figure 24. Projections or depressions may be conveniently formed by making coupling with walls of extra thickness and cutting away portions of the wall to leave a projecting portion as shown in Figures 21 to 23 or cutting recesses or depressions such as the groove shown in Figure 24. Figures 21 to 23 illustrate different types couplings which may be employed, Figure 21 showing two male ends, Figure 23 two female ends, and Figure 22 one end of each kind. It is obvious that grooves or depressions may be cut on any of these types of couplings instead of the rib shown. In using the multiple coupling, successive multiple couplings are set up on the job alternately with individual conduits between them, the couplings serving to support the conduits in properly spaced relation as well as to provide joints for abutting ends of individual conduits. Figure 18 illustrates the manner of laying a multiple coupling block with indivdual conduit sections, fragments of which are indicated at 40.

Having thus described certain embodiments of this invention, it should be evident to those skilled in the art that various changes and modifications might be made therein without departing from its spirit or scope as defined by the appended claims.

I claim:—

1. An article of manufacture, comprising a plurality of water proofed fiber conduit sections in side-by-side relation, and spaced members at intervals along the sections for holding the sections in predetermined relative positions, said members each consisting of a collar extending around each section and a molded core interlocking with said collars and anchoring them in predetermined relative position.

2. An article of manufacture, comprising a plurality of sections of waterproofed fiber conduits in side-by-side relation, spaced members at intervals along the conduit sections for holding the sections in predetermined relative positions, said members each consisting of a split collar extending around each section and a perforated cement core interlocking with said collars and anchoring them in predetermined relative position, and fastening elements projecting from the collars into the conduit sections.

3. As an article of manufacture, a spacing element for multiple conduit sections, comprising a plurality of collars, and a core of plastic material cast and set in interlocking relation with said collars and anchoring them in fixed relative position.

4. As an article of manufacture, a spacing element for multiple conduit sections, comprising a plurality of collars, and a cement core in interlocking engagement with each collar.

5. As an article of manufacture, a spacing element for multiple conduit sections, comprising a plurality of diagonally split collars, and a cement core in interlocking engagement with each collar.

6. As an article of manufacture, a spacing element for multiple conduit sections, comprising a plurality of collars, and a centrally apertured cement core in interlocking engagement with each of said collars.

7. As an article of manufacture, a spacing element for multiple conduit, comprising a plurality of waterproofed fiber collars, each collar being diagonally split, and a centrally apertured cement core in interlocking engagement with a portion of each collar remote from its split.

8. As an article of manufacture, a cylindrical collar having a portion with a notch in each of its end edges, the sides of said notches being undercut.

9. As an article of manufacture, a waterproofed fiber collar having a portion only of an end edge inwardly beveled.

10. As an article of manufacture, a waterproofed fiber collar having a portion with a diagonal slit therethrough, and another portion with opposed notches in the ends thereof with inwardly beveled edges.

11. As an article of manufacture, a cylindrical collar having a notch in an end edge thereof, the sides of said notch being undercut, and the bottom of said notch being beveled inwardly.

In testimony whereof I have affixed my signature.

HOWARD PARKER.